United States Patent [19]

Turnbough

[11] 4,319,676
[45] Mar. 16, 1982

[54] ARTICLE COMBINER CONVEYOR APPARATUS

[75] Inventor: Harold L. Turnbough, Lemay, Mo.
[73] Assignee: Alvey Inc., St. Louis, Mo.
[21] Appl. No.: 146,105
[22] Filed: May 2, 1980
[51] Int. Cl.³ .............................................. B65G 47/68
[52] U.S. Cl. .................................... 198/449; 198/454
[58] Field of Search ............... 198/440, 448, 449, 454, 198/458

[56] References Cited

U.S. PATENT DOCUMENTS

| | | | |
|---|---|---|---|
| 3,028,946 | 4/1962 | Krupp et al. | 198/448 |
| 3,693,776 | 9/1972 | Harrison | 198/448 |
| 3,731,782 | 5/1973 | Del Rosso | 198/439 |
| 3,791,518 | 2/1974 | Vanderhoof | 198/440 X |
| 3,809,207 | 5/1974 | Euverard | 198/458 |

Primary Examiner—Jeffrey V. Nase
Attorney, Agent, or Firm—Gravely, Lieder & Woodruff

[57] ABSTRACT

Article conveying apparatus having a suitably wide conveying surface for receiving articles from a plurality of delivery conveyors, and wherein the articles are directed on the conveying surface by laterally movable pushers carried by the conveying surface to a single discharge conveyor, the pushers being guided along paths which are initially spaced apart adjacent the plurality of delivery conveyors so as to be at the outside of the articles delivered from any of the delivery conveyors and which move laterally on the conveying surface to engage the articles and progressively direct them into alignment with the single discharge conveyor, and guide means cooperating with the pushers for moving the pushers between the initially spaced apart relation and the positions aligned with the discharge conveyor.

6 Claims, 5 Drawing Figures

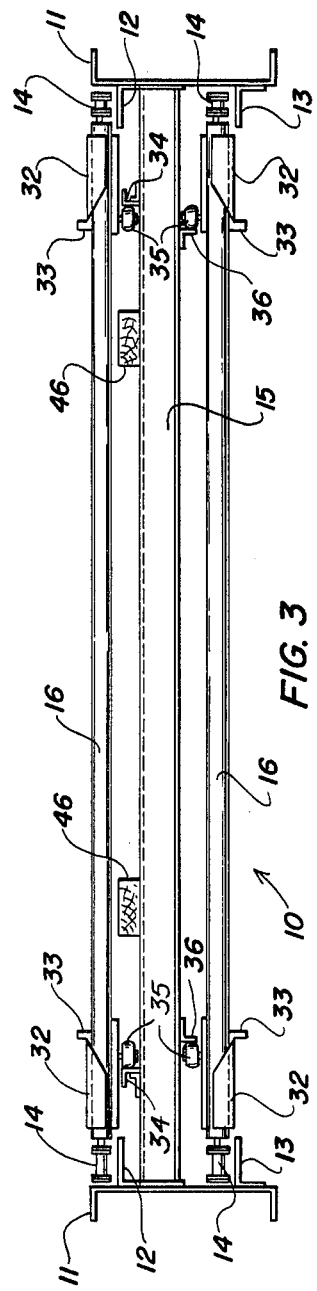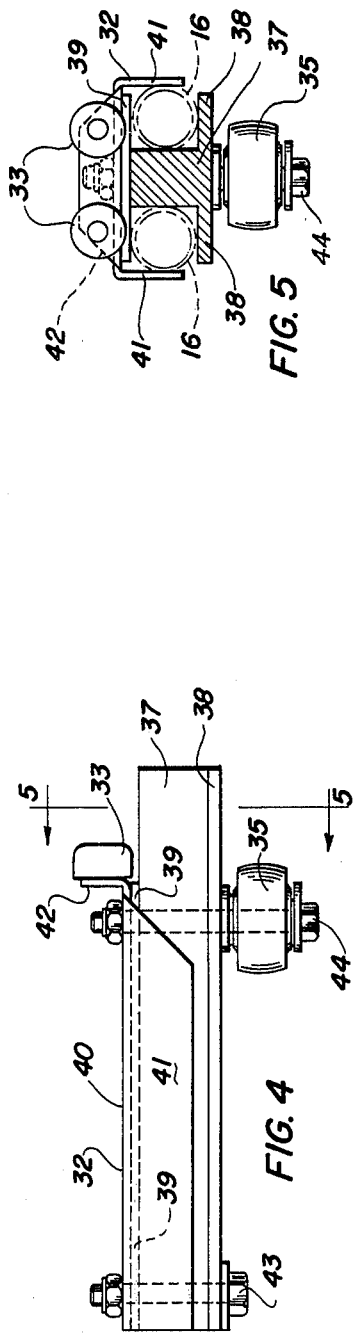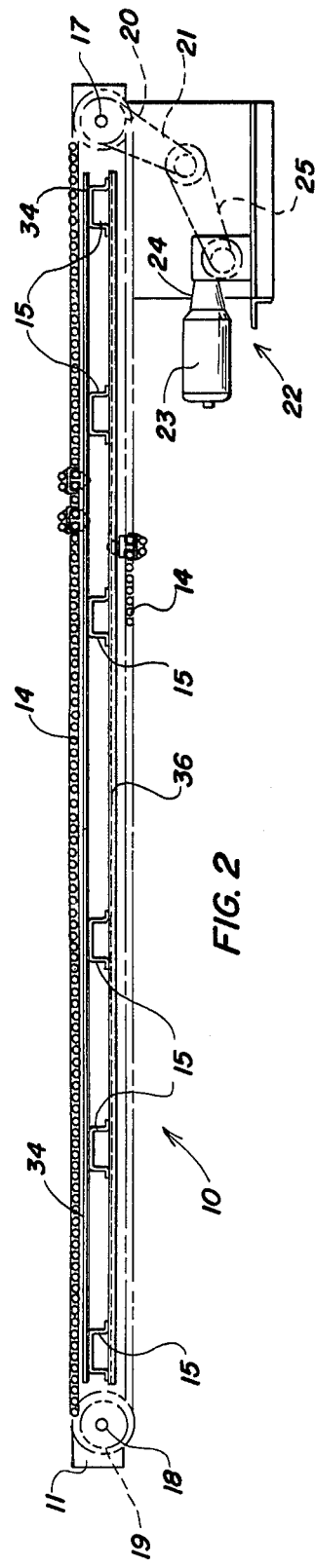

ARTICLE COMBINER CONVEYOR APPARATUS

BACKGROUND OF THE INVENTION

The efficient handling of an array of different articles in a warehouse system is especially important when it comes to filling orders and meeting delivery deadlines. It is the usual arrangement in warehouses that many articles of varying sizes and weights are stored in positions for easy delivery to a system of branch conveyors which, in turn, connect up to a conveyor and effectively and rapidly combine the flow of articles into a single conveyor which leads to a loading dock or other location where article pick-up is provided.

The problem is to handle a plurality of lines of articles coming out of a warehouse, where the articles vary in size and weight. This is difficult because of these variations, and a number of conveyors have been developed which will permit the movement of mixed articles into a single file line for delivery onto a single line conveyor. Again, there is a problem of moving articles in the foregoing manner while preventing jamming or choking the inlet to the single file line. A further problem in the art is to provide a conveying surface suitable for supporting the various size and weight mix of articles without the need for providing special carriers. The prior art has, by and large, moved in the direction of utilizing special carriers which must be moved in lateral directions with respect to the line of travel of the articles, and such carriers are usually arranged to slide on a system of rods or tubes, where the sliding movement is developed by fixed cams.

There are a number of different arrangements for moving articles between multiple conveyors and a single conveyor by an intermediate conveying apparatus. These arrangements are sometimes driven so that articles moved by a single conveyor are distributed and delivered to any of a plurality of conveyors, or the article movement may be in the reverse direction. Many of these prior arrangements involve complicated structures embodying switching devices, require special carriers on which the articles are moved, and involve an excessive use of energy to drive the system. Prior examples of such arrangements are disclosed in U.S. Patents to Anderson U.S. Pat. No. 1,931,454 of Oct. 17, 1933; Krupp et al., U.S. Pat. No. 2,897,947 of Aug. 4, 1959; Shuster et al., U.S. Pat. No. 3,580,379 of May 25, 1971; Kennedy, U.S. Pat. No. 3,749,225 of July 31, 1973; Wickam, U.S. Pat. No. 3,987,888 of Oct. 26, 1976; and Maxted, U.S. Pat. No. 4,044,897 of Aug. 30, 1977.

Automatic or semi-automatic warehousing systems include control means for organizing the picking of articles from the various storage bins or holding bays so that quantities of similar articles can be loaded onto conveyors. Several different conveyors are necessarily provided so that articles of one kind can be segregated to a particular conveyor. The system is set up so that all of the conveyors usually run to a station where the flow of articles from the different conveyors can be selectively moved on to a single conveyor. In this manner, like articles can be delivered to a single conveyor in a predetermined order, or articles of different character can be combined on a single conveyor. The single conveyor is then directed to a loading dock or an order picking station for further handling.

SUMMARY OF THE INVENTION

This invention relates to improvements in article combiner conveyor apparatus.

It is a general objective of the present invention to provide a conveying surface which is interposed between a plurality of article supply conveyors and a single line article take-off conveyor, with particular emphasis on providing a simple, economical, and trouble free apparatus for moving articles in any preselected order from the several conveyors and delivering the same in a single file order to the take-off conveyor.

It is a further objective of the present invention to provide a simple and effective article conveying surface, and to incorporate in such surface means for pushing articles in a direction so as to form a single line flow on to the take-off conveyor.

A particular objective of the invention is to avoid the need for special article carriers and to effect the combining flow of articles by simple pusher elements which follow predetermined paths of an endless character.

A preferred embodiment of the present invention includes an array of article conveying members movable in a closed or endless path in which there is an upper surface for support of the articles to be conveyed and a lower return path of travel, wherein the upper surface moves between an article receiving end and an article discharge end, and in which article pushing means operatively carried on the conveying members are arranged to move between laterally spaced relations so as to embrace articles delivered by conveyors at the receiving end and effectively direct the flow of articles on to a single take-off conveyor at the discharge end.

BRIEF DESCRIPTION OF THE DRAWINGS

A preferred embodiment of the present invention is illustrated in the accompanying drawings wherein:

FIG. 2 is a longitudinal sectional elevation of the combiner apparatus as seen along line 2—2 of FIG. 1;

FIG. 3 is a transverse sectional elevational view taken along the line 3—3 in FIG. 1;

FIG. 4 is a detailed view on a somewhat enlarged scale of a typical article pusher means; and FIG. 5 is an end view of the pusher means seen along line 5—5 in FIG. 4.

DESCRIPTION OF A PREFERRED EMBODIMENT

Figure 1:
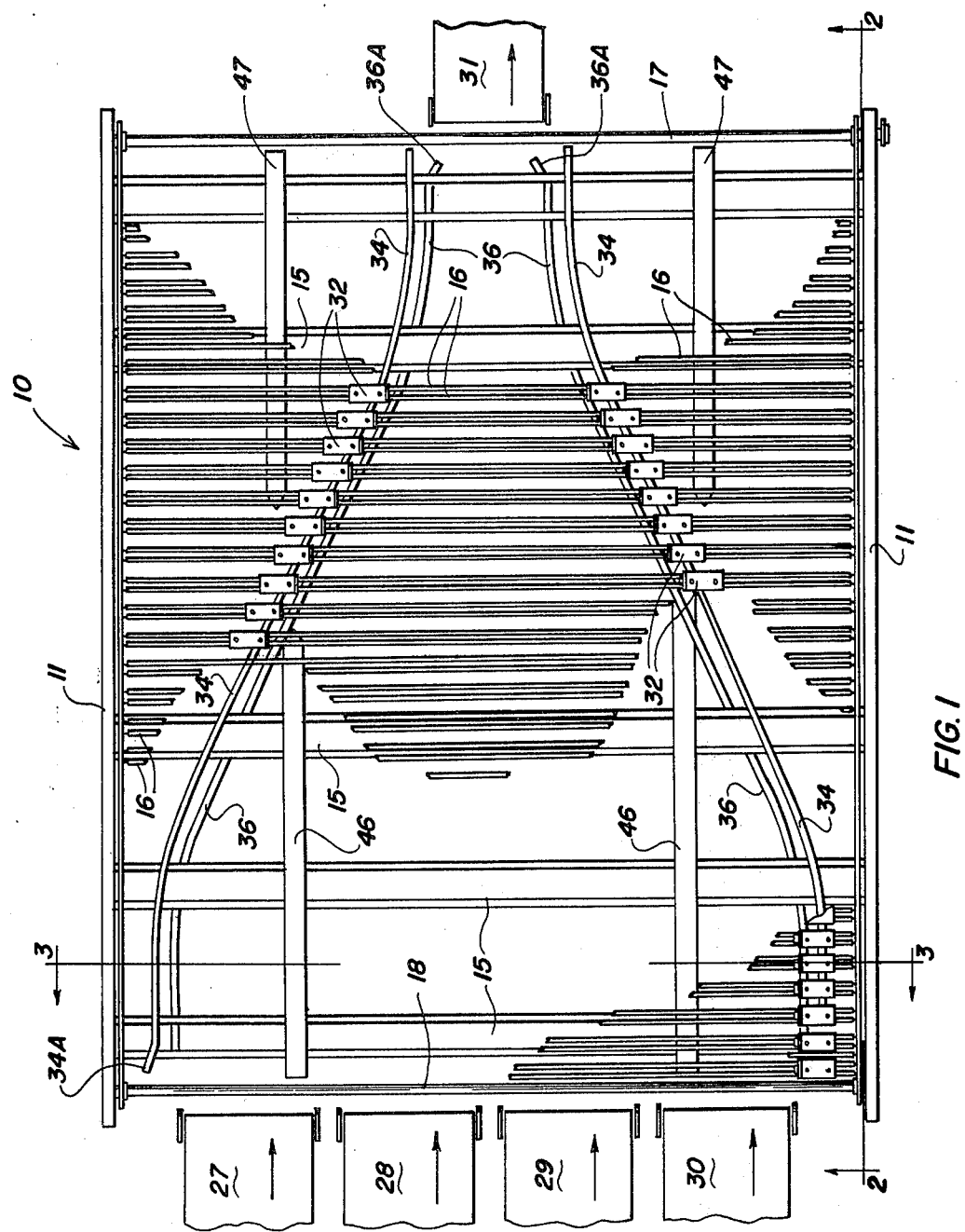
FIG. 1 is a plan view of the article combiner apparatus illustrating certain important characteristics of the present embodiment.

The conveying apparatus 10 seen in FIGS. 1, 2 and 3 comprises spaced side rails 11 which support angle members 12 forming upper tracks and angle members 13 forming lower tracks. These tracks carry the respective upper and lower runs of endless chains 14. The side rails 11 are held in fixed position by a plurality of transverse hat-section beams 15 fixed at the ends to the side rails 11. The chains 14 are connected to the opposite ends of an array of article conveying members 16 which may be tubular for both strength and light weight. The drive for the chains 14 is through a power shaft 17 supported by the side rails and by an idler shaft 18. These shafts 17 and 18 have sprockets 19 fixed thereto for meshing with the chains 14 in known manner. At a convenient location on power shaft 17 there is affixed a driven sprocket 20 for engaging a drive chain 21 of the power package 22. A suitable motor 23 operates a gear unit 24 which drives a sprocket and chain take-off 25 for transmitting the drive to the chain 21.

As can be seen best in FIG. 1, the array of article supporting tubular members 16 forms an upper conveying surface movable from the idler shaft 18 toward the power shaft 17. Since these members are suitably connected to the respective endless chains 14 they return from shaft 17 toward shaft 18 at a lower level. These upper and lower paths of travel of members 17 is seen in FIG. 3. The members 16 have a suitable length between chains 14 to accommodate a plurality of article delivery or supply means in the form of belt conveyors 27, 28, 29 and 30. The article delivery or discharge end of the conveyor 10 is a single belt conveyor 31 located substantially centered between side rails 11, but it does not necessarily have to be so disposed.

In order for articles delivered from any supply conveyor means 27, 28, 29 or 30 to be moved by the array of members 16 to conveyor means 31, pusher means 32 is provided to move both with and with respect to the members 16. It can be seen in FIGS. 1, 3 and 5 that the pusher means 32 are supported on a pair of adjacent members 16, and each pusher is provided with article engaging pushing pads 33 located above the plane of the array of members 16 in the upper pass of travel so as to engage articles at a level which is most effective for pushing. In FIGS. 1 and 3, the pusher means are adapted to follow paths that are formed by guide tracks 34. These tracks 34 are disposed on the upper surfaces of the beams 15 and just beneath the upper travel of the article supporting members 16. The tracks 34 define the outer limits of the area on the members 16 so that all articles from conveyors 27 or 30 will be inside those tracks. The tracks 34 are fixed in positions to converge upon and assume a spaced relation adjacent the discharge end of the conveyor 10 which is suitable to transfer articles onto the single conveyor 31. In the view of FIG. 1, the tracks 34 are generally symmetrically located relative to the longitudinal center line of the array of members 16 since the single conveyor 31 is substantially aligned to that center line. In this manner as opposed pairs of pusher means 32 emerge above the idler shaft 18 they are most widely spaced to be outside the position of an article delivered from either conveyor 27 or 30. As the pairs of pushers advance along the tracks 34 with the movement of members 16, rollers 35 (FIGS. 3, 4 and 5) engage the tracks and cause the pushers 32 to slide relative to the members 16 and in a direction to converge or draw toward each other until an article is captured between pairs of pushers in advance of the article being discharged onto conveyor 31.

Once the pushers 32 have aligned an article with conveyor 31, they pass around driven shaft 17 and into a lower return pass. At this time the rollers 35 are engaged on the outer side of second tracks 36 fixed to the undersides of the beams 15 (see FIG. 3). These lower tracks 36 are given the same curvate form as for the upper tracks 34. However, tracks 36 may be merely straight and given an angular alignment to accomplish the return of the pairs of pushers 32 to the widely spaced starting positions. It can be seen in FIG. 1 that the upper tracks 34 are formed with flared ends 34A (one being seen) to accommodate pick-up of the rollers 35 as the pushers rise up and travel over the idler shaft 18. In like manner the lower tracks 36 are formed with flared ends 36A to pick-up the rollers 35 as the pushers 32 pass down and under the shaft 17.

In FIGS. 4 and 5, a typical pusher 32 has been shown. The body 37 is an inverted T having lateral flanges 38. The upper surface of the body 37 carries a plate 39 to support a channel 40 having down-turned side flanges 41 which are outside the sides of the plate 39 (FIG. 5). Channel 40 has a nose flange 42 which is bent upwardly to carry pusher pads 33. The assembly of the several parts of the pusher 32 provides two spaces between the flanges 38, 41, plate 39 and body 37 for the reception of a pair of members 16. The parts are secured in assembly by bolts 43 and 44, the latter bolt 44 being used as the axle for roller 35.

FIGS. 1, 2 and 3 disclose a safety feature in the form of elongated blocks 46 and 47 carried on top of the beams 15 such that the upper surfaces are spaced below and out of rubbing contact with the array of members 16. These blocks are distributed in a manner to accommodate the weight of a service person walking on the members 16. The members 16 are selected to be capable of supporting reasonably heavy articles whose weight is distributed over many members 16, but a person's weight concentrated on only a few members 16 might permanently bend the members and interfere with the operation. However, the blocks 46 and 47 are placed to prevent such permanent bending results while allowing some service functions out in the mid-area of the article conveying array of members 16.

The operation of the embodiment above described is to receive articles from any of the conveyor belts 27–30 and direct the articles onto conveyor belt 31. It is not intended that articles will enter the array of members 16 simultaneously from two or more conveyors 27–30, but it is expected that articles can be timed to enter in any order such that they can be combined into a single file flow out to conveyor 31. The timing by any suitable means, not a part of this disclosure, is intended to avoid allowing two articles to be caught side-by-side between the pairs of spaced pushers 32 which would jam the operation. The articles while being pushed by the means 32 are not turned, but merely angled along the path by the pushers and eventually straightened out into the orientation of the initial delivery onto the array of members 16.

The conveyor is composed of elongated rod members 16 which are attached to the side chains 14 so as to retain parallelism in operation, and pusher means 32 mounted on adjacent pairs of members 16 to prevent rotating into inoperative attitudes. The pusher means 32 are arranged in spaced pairs on the same members 16 so as to cooperate with articles as they are conveyed into the delivery end of the conveyor. Since the pusher means 32 do not need to carry any article, they can be small and easily slid or guided by suitably shaped tracks 34 on the parallel members 16 to perform the above described function. The non-load bearing pusher means 32 to not require lubrication and can avoid rapid wear on the sliding surface.

As articles are delivered by conveyor 27, they are pushed by the adjacent means 32 to follow the path dictated by the shape of the track 34. As the articles approach the area where tracks 34 bring the opposed pairs of pushers 32 into close proximity to the articles they serve to prevent lateral misalignment and preserve the original orientation of the articles as they pass onto the conveyor 31. The same operation takes place for articles from conveyor 30 but in just the opposite way. Articles from either conveyor 28 or 29 will not be engaged by pusher means 32 until near the area where pushers can come into contact. In these cases the pusher pads 33 are moving at the same speed as the articles so the only relative motion will be in the pads moving toward the articles from one or opposite sides. Thus, no scratching, scarring or other surface damage can occur, and only gentle contact will take place in view of the angle of approach of the pusher means 32. The present arrangement also overcomes certain problems present in prior conveyors where articles are placed on carriers which then must slide on rods in traversing a conveyor path. In the present arrangement the rods carry the load of the articles, and pushing means can therefore be greatly reduced in size and will avoid the need for extra power to slide the pushers on the rods as no article weight is borne by the pushers.

The foregoing description has set forth exemplary details of a conveyor apparatus for handling articles from several different conveyors and combining or directing those articles onto a single file conveyor. The preferred conveyor has been constructed to provide a large area of conveying members which carry the articles and also support pusher means which direct the articles along paths to form a single file flow. Variations in structure may be suggested from the disclosure without departing from the spirit of the improvement provided herein.

What is claimed is:

1. Article combiner conveyor apparatus including: an array of article conveying members movable in an endless closed path in which said members are load bearing and form an upper surface for the support of the articles to be conveyed and follow a lower return path of travel, said members moving through said upper surface between an article receiving end and an article discharge end; article pushing means operatively mounted on said load bearing members and arranged in laterally spaced paired relation on said members so as to be initially spaced at the article receiving end of said upper surface; first guide means in said apparatus for cooperation with said pushing means, said first guide means being disposed in relation to said upper surface to progressively move said pushing means laterally on said members from the widely spaced relation at said article receiving end toward each other into a closer spaced relation sufficient at least to allow passage of articles in single file therebetween while moving with said load bearing members toward the article discharge end; second guide means cooperating with the lower return of said members for engaging said pushing means and progressively returning them to said initial widely spaced relation at the article receiving end of said upper surface; a plurality of article supply means adjacent said receiving end for delivering articles onto said upper surface from laterally spaced positions, said pusher means engaging the articles from the side thereof which is closest to the position of a pusher means as the articles and the pusher means travel with the array of conveying members for directing said articles laterally in paths along said upper surface which orient the articles for single file passage from said upper surface at substantially the same location adjacent the discharge end.

2. The article combiner conveyor apparatus set forth in claim 1, wherein said load bearing members are elongated rods; and said article pushing means are slidably carried by pairs of said rods.

3. The article combiner conveyor apparatus set forth in claims 1 or 2, wherein said first guide means is carried in fixed position adjacent said upper surface; said second guide means is carried in fixed position adjacent said lower return path of said members; and said article pushing means operatively engage said first and second guide means and are forced to slide on said members.

4. The article combiner conveyor apparatus set forth in claim 1, wherein said plurality of article supply means are arranged in side-by-side relation adjacent said receiving end of said upper surface, and said laterally spaced pushing means are mounted on said conveying members in paired relation and spaced apart to initially span the distance required by said side-by-side arrangement of said article supply means.

5. The article combiner conveyor apparatus set forth in claim 1, wherein an article receiving conveyor is disposed adjacent said discharge end and in alignment with the location of said pushing means at said closer spaced relation.

6. Article combiner conveyor apparatus including: an array of elongated rods; drive means for said rods connected by their opposite ends to form an endless conveyor having an upper article conveying path of travel and a lower return path of travel, said upper path defining a surface moving between a receiving end and a discharge end; a plurality of article supply conveyors adjacent said receiving end of said conveying surface and arranged in side-by-side relation along the length of said elongated rods; a single article receiving conveyor adjacent said discharge end of said conveying surface; article pusher means operatively mounted on said array of elongated rods in opposed and spaced apart paired relation for movement with and along the length of said rods from opposite sides of the articles supplied to said conveying surface; first guide means extending below and adjacent said upper path of travel of said elongated rods between said receiving and discharge ends, said first guide means and pusher means being in operative engagement and defining the path of travel of said pairs of said article pusher means along said article conveying surface from positions at said receiving end widely spaced to include therebetween from either side of any article from any of said plurality of article supply conveyors so as to laterally shift such articles to positions which orient the articles for single file passage onto said single article receiving conveyor; and second guide means extending adjacent said lower path of travel of said elongated rods and engaging said pairs of pusher means for returning said pusher means from said discharge to said spaced apart relation approaching said receiving end along said lower path of travel.

* * * * *